United States Patent [19]

Vogt et al.

[11] Patent Number: 4,473,149

[45] Date of Patent: * Sep. 25, 1984

[54] ROLLER CONVEYOR WITH FRICTION ROLL DRIVE

[75] Inventors: Robert K. Vogt; Martin A. Heit, both of Cincinnati, Ohio

[73] Assignee: The E. W. Buschman Company, Cincinnati, Ohio

[*] Notice: The portion of the term of this patent subsequent to Aug. 22, 1995 has been disclaimed.

[21] Appl. No.: 914,851

[22] Filed: Jun. 12, 1978

Related U.S. Application Data

[63] Continuation-in-part of Ser. No. 710,442, Aug. 2, 1976, Pat. No. 4,108,303.

[51] Int. Cl.³ .............................................. B65G 13/02
[52] U.S. Cl. .................................................. 198/781
[58] Field of Search ............... 198/781, 789, 790, 791; 92/84; 267/177, 175, 136

[56] References Cited

U.S. PATENT DOCUMENTS

| | | | |
|---|---|---|---|
| 1,000,494 | 8/1911 | Clement | 267/177 |
| 3,225,893 | 12/1965 | Currie | 198/781 |
| 3,612,248 | 10/1971 | Wallis | 198/781 |
| 3,718,248 | 2/1973 | Muller | 198/781 |
| 3,840,110 | 10/1974 | Molt et al. | 198/781 |
| 3,939,962 | 2/1976 | Gebhardt | 198/781 |
| 4,108,303 | 8/1978 | Vogt et al. | 198/781 |
| 4,109,783 | 8/1978 | Vogt | 198/781 |

FOREIGN PATENT DOCUMENTS 344191  11/1905  France ................................ 267/177

OTHER PUBLICATIONS

Fluid Power, Bureau of Naval Personnel Navy Training Course, NAVPERS 16193-A, 1966, pp. 45, 46 and 47.

Primary Examiner—Jeffrey V. Nase
Attorney, Agent, or Firm—Biebel, French & Nauman

[57] ABSTRACT

A roller conveyor having housings pivotally mounted below the rollers. Friction rolls rotatably mounted in the housings drive the rollers. The friction rolls are urged against the rollers with controlled pressure. A diaphragm or a spring can raise each housing to operative position to cause the associated friction roll to drive the associated roller. The pressure is controlled so that if one of the rollers is restrained, the associated friction roll can slip.

1 Claim, 10 Drawing Figures

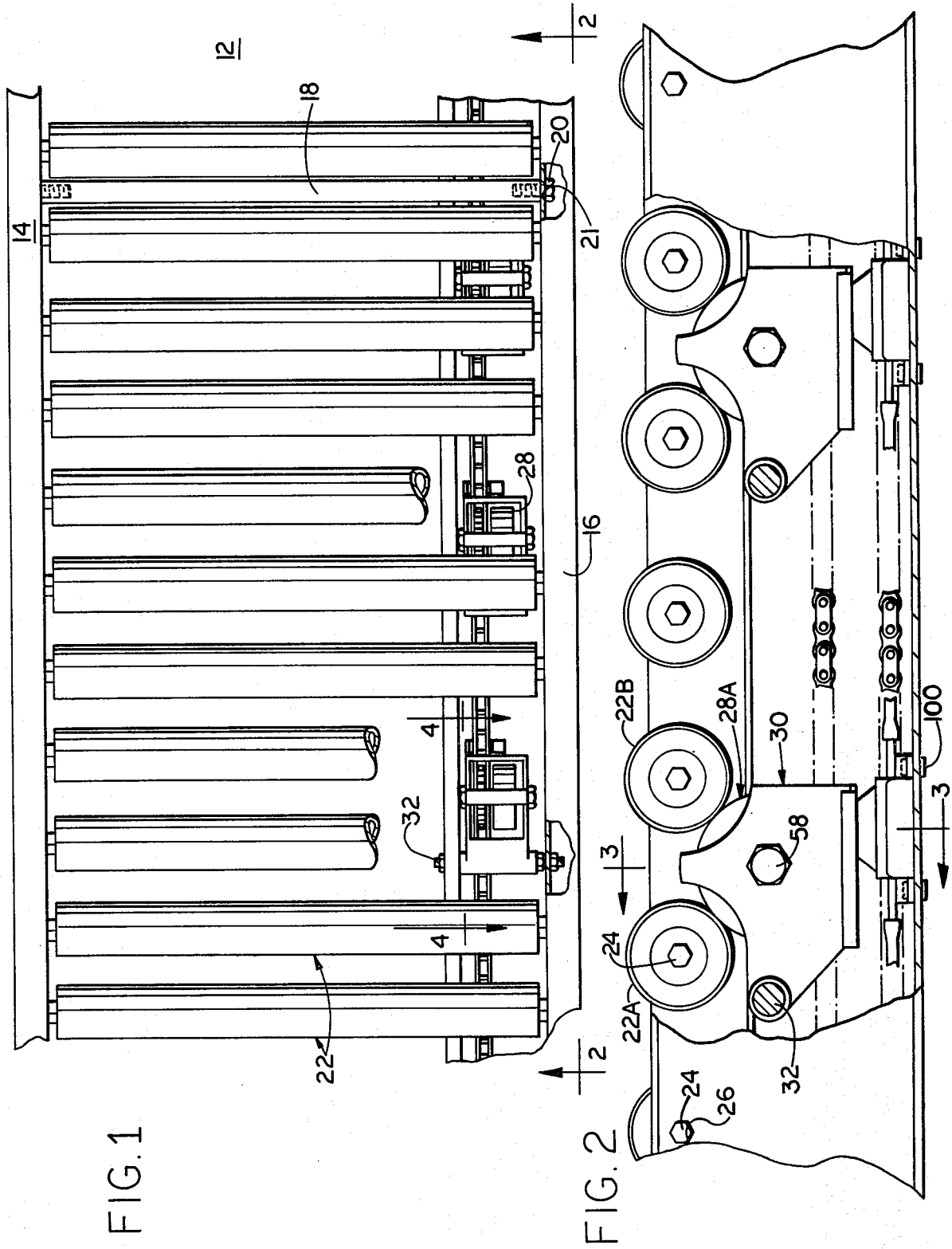

ROLLER CONVEYOR WITH FRICTION ROLL DRIVE

This application is a continuation-in-part of our co-pending application Ser. No. 710,442 filed Aug. 2, 1976, now U.S. Pat. No. 4,108,303.

This invention relates to conveyors. More particularly, this invention relates to a roller conveyor and to a drive for a roller conveyor.

An object of this invention is to provide a drive for an article supporting roller of a conveyor in which a friction roll underlies and drives the article supporting roller.

A further object of this invention is to provide such a conveyor drive in which a housing in which the friction roll is rotatably mounted is urged in a direction to bring the friction roll into driving relation with the article supporting roller with a controlled pressure.

A further object of this invention is to provide such a conveyor drive in which the friction roll is held in engagement with an article supporting roller by a diaphragm member which engages a housing in which the friction roll is rotatably mounted to bring the friction roll into driving relation with the article supporting roller.

A further object of this invention is to provide such a conveyor in which the diaphragm member is advanced by fluid under pressure, and pressure in a line supplying fluid to the diaphragm member can be controlled so that the friction roll can be caused to drive the article supporting roller under normal conditions but the friction roll can be permitted to slip if the article supporting roller is restrained.

A further object of this invention is to provide such a conveyor drive in which a spring urges the housing in a direction to cause the friction roll to engage the article supporting roller and the pressure exerted by the spring can be adjusted.

Briefly, this invention provides a device for driving an article supporting roller of a conveyor which includes a friction roll rotatably mounted in a housing. Means is provided for rotating the friction roll. The housing can be urged in a direction to bring the friction roll into driving relation with the article supporting roller by a diaphragm or by a spring. Fluid under pressure is supplied to the diaphragm from an appropriate source of fluid under pressure. The fluid is supplied through a line which includes a pressure regulator valve which can be set so that the friction roll drives the article supporting roller under normal conditions but the friction roll can slip if the article supporting roller is restrained.

The above and other objects and features of the invention will be apparent to those skilled in the art to which this invention pertains from the following detailed description and the drawings, in which:

FIG. 1 is a plan view of a fragmentary section of a conveyor which includes a drive for article supporting live rollers constructed in accordance with an embodiment of this invention, parts being broken away to show details of construction;

FIG. 2 is a view in side elevation looking in the direction of the arrows 2—2 in FIG. 1, parts being broken away for clarity, housings of the conveyor shown in raised position;

In the following detailed description and the drawings, like reference characters indicate like parts.

Figure 3:
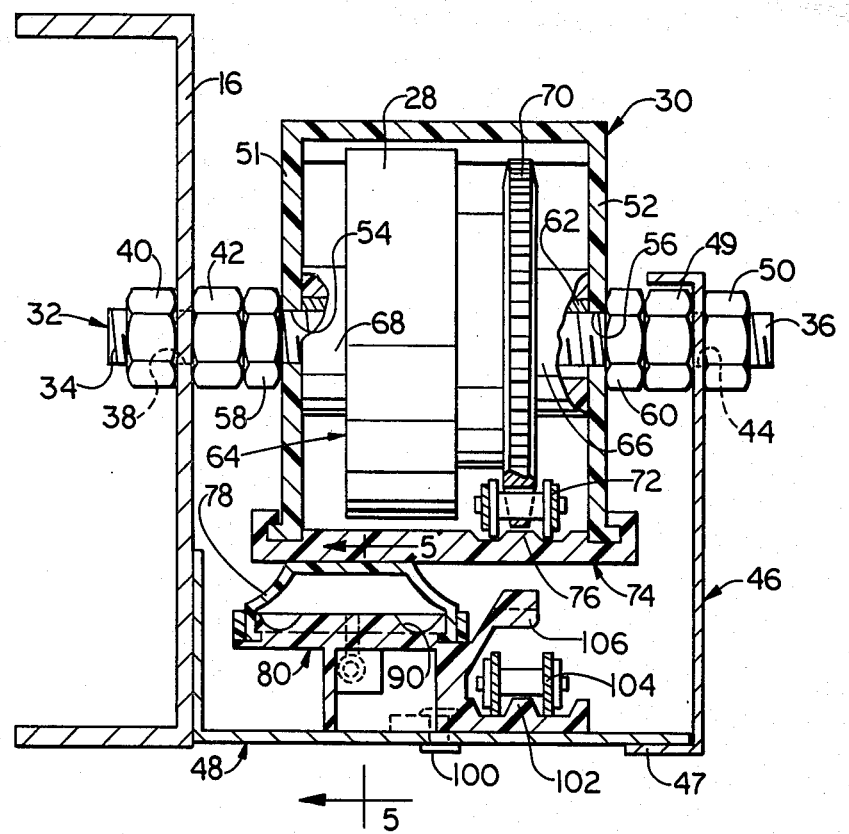
FIG. 3 is a view in section taken on the line 3—3 in FIG. 2.

In FIG. 1 is shown a fragmentary portion of a conveyor 12. The conveyor 12 includes side rails 14 and 16. The side rails 14 and 16 are supported by appropriate supports, not shown. Appropriate cross bars 18, one of which is shown in FIG. 1, hold the side rails 14 and 16 in spaced parallel relation. Fasteners 20 mounted in openings 21 in the side rails 14 and 16 are received in end portions of the cross bar 18.

Article supporting rollers 22 are rotatably mounted on cross rods 24 of hexagonal cross section. The cross rods 24 are received in hexagonal openings 26 in the side rails 14 and 16. Selected pairs of the rollers 22 are engageable by friction rolls 28 in the manner that the friction roll 28A (FIG. 2) engages the rollers 22A and 22B.

Figure 4:
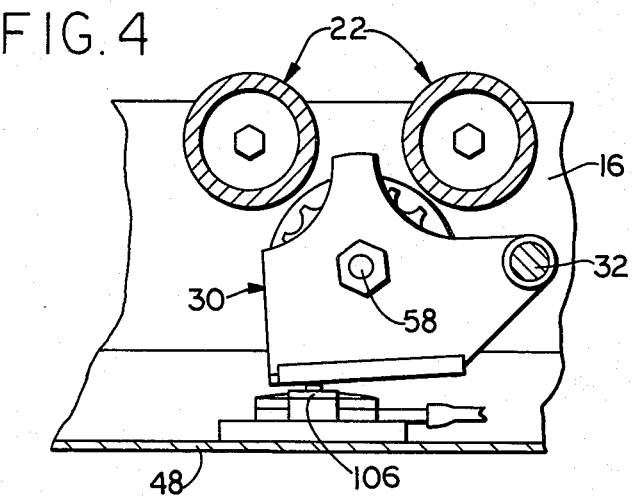
FIG. 4 is a view in section taken on the line 4—4 in FIG. 2, a housing being shown in lowered position.
Figure 5:
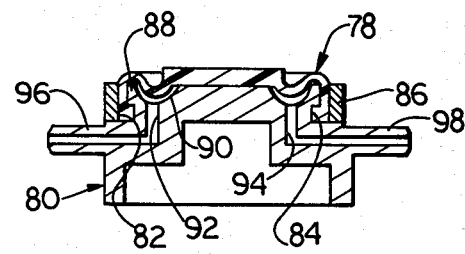
FIG. 5 is a view in section taken on the line 5—5 in FIG. 3.
Figure 6:
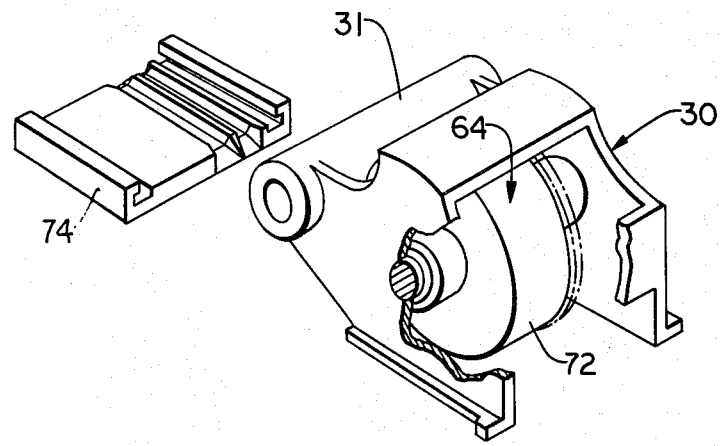
FIG. 6 is a fragmentary exploded view of a housing and an associated friction roll assembly, parts being broken away to reveal details of structure.

Each of the friction rolls 28 is rotatably mounted in a housing 30. Details of construction of one of the housings 30 and associated members are shown in FIGS. 3, 5, and 6. The housing 30 includes a tubular portion 31 which receives a shaft member 32. The shaft member 32 has threaded end portions 34 and 36. The threaded end portion 34 extends through an opening 38 in the side rail 16. Nuts 40 and 42 mounted on the threaded end portion 34 engages opposite faces of the side rail 16. The threaded end portion 36 extends through an opening 44 in an upright web of a channel-shaped frame and guard member 46. A lower flange 47 of the member 46 is supported on an angle-shaped frame 48 which, in turn, is supported on the side rail 16. Nuts 49 and 50 mounted on the threaded portion 36 engage opposite faces of the upright web of the member 46. The housing 30 can swing about the shaft member 32 between a raised position shown in FIG. 3 and a lowered position shown in FIG. 4.

The housing 30 includes side walls 51 and 52, which are provided with openings 54 and 56, respectively, in which a bearing support bolt 58 is mounted. A nut 60 threaded on the bolt 58 holds the bolt 58 in position. A bearing sleeve 62 is mounted on the bolt 58 between the side walls 50 and 52. A friction wheel assembly 64 is rotatably mounted on the bearing sleeve 62. The friction wheel assembly 64 includes a hollow body 66 having a central portion 68 which receives the bearing sleeve 62 and a sprocket portion 70 integral with the central portion 68. Mounted on the body 66 is a ring of rubber-like material havng an outer face for engagement with selected rollers which forms one of the friction rolls 28.

The housing 30 carries a removable bottom plate 74, which is slidably mounted on lower edge portions of the side walls 51 and 52. A chain guide rib 76 on the bottom plate 74 underlies the sprocket portion 70 and serves to guide an upper or drive chain course 72 in driving engagement with the sprocket portion 70. The bottom plate 74 can be removed to permit the drive chain course to disengage from the sprocket portion 70.

The housing 30 is raised by a diaphragm 78 (FIGS. 3 and 5) of generally inverted cup-shape. The diaphragm 78 is mounted on a seat molding 80. An annular peripheral flange 82 of the diaphragm extends into a circular slot 84 in the seat molding 80. A ring 86 holds a wall of the diaphragm against a cylindrical flange 88 of the seat molding 80. An annular groove 90 is formed in the seat molding 80 inwardly of the flange 88. As shown in FIG. 5, channels 92 and 94 in the seat molding 80 communicate with the groove 90. The channels 92 and 94 also communicate with the interior of coupling tube portions 96 and 98, respectively, of the seat molding 80. The seat molding 80 is mounted on the angle-shaped frame 48 with the diaphragm 78 underlying the housing 30 by means of fasteners 100. The seat molding 80 also includes a chain guide portion 102, which guides a return chain course 104, and a projection 106. The projection 106 overlies the chain guide portion 102 and underlies the housing 30, and, as shown in FIG. 4, can serve as a stop limiting downward swinging of the housing 30.

Figure 7:
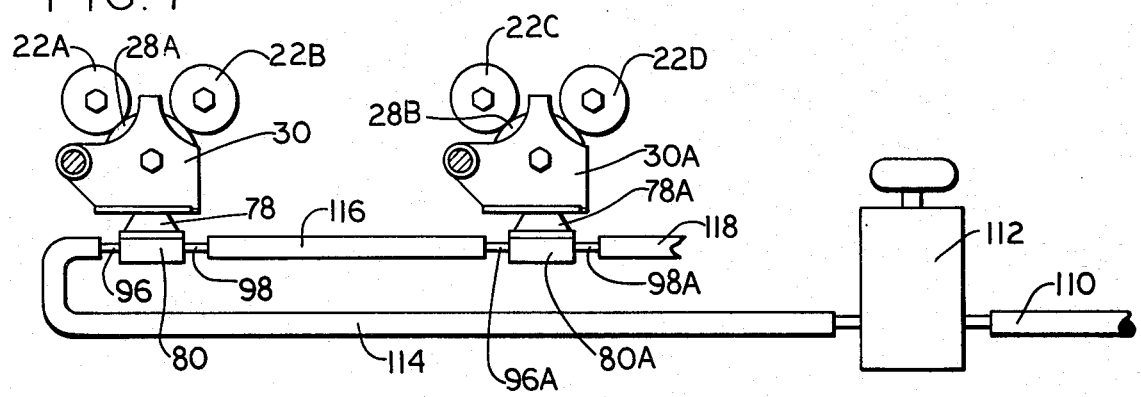
FIG. 7 is a schematic view showing pneumatic connections to housing actuating assemblies.

The chain courses 72 and 104 can be driven by an appropriate power source, not shown, to rotate the friction rolls 28. When fluid under pressure is introduced through the coupling tube portions 96 and 98, the diaphragm 78 is expanded to raise the friction roll 28 into driving engagement with associated rollers 22. Fluid under pressure can be supplied by a line 110 (FIG. 7) connected to an appropriate source of fluid under pressure (not shown), such as an air pressure line. The line 110 is connected to an adjustable self-relieving pressure regulator 112. The pressure regulator can be of the type known as Bellofram 10B, a trademark of Bellofram Corporation.

The pressure regulator 112 supplies fluid at a selected pressure to a line 114. The line 114 can be connected to the coupling tube portion 96 of the seat molding 80. A line 116 connects the coupling tube portion 98 of the seat molding 80 to a coupling tube portion 96A of a seat molding 80A. A coupling tube portion 98A of the seat molding 80A can be closed by a cap 118. The pressure regulator can be adjusted to deliver sufficient pressure to diaphragms 78 and 78A to cause housings 30 and 30A to be raised to bring the friction rolls 28A and 28B into engagement with associated article supporting live rollers 22A, 22B, 22C, and 22D to drive the live rollers. However, the pressure is preferably insufficient to cause turning of the live rollers when the live rollers are restrained, as by a package (not shown) mounted on the conveyor and inadvertently restrained.

Figure 8:
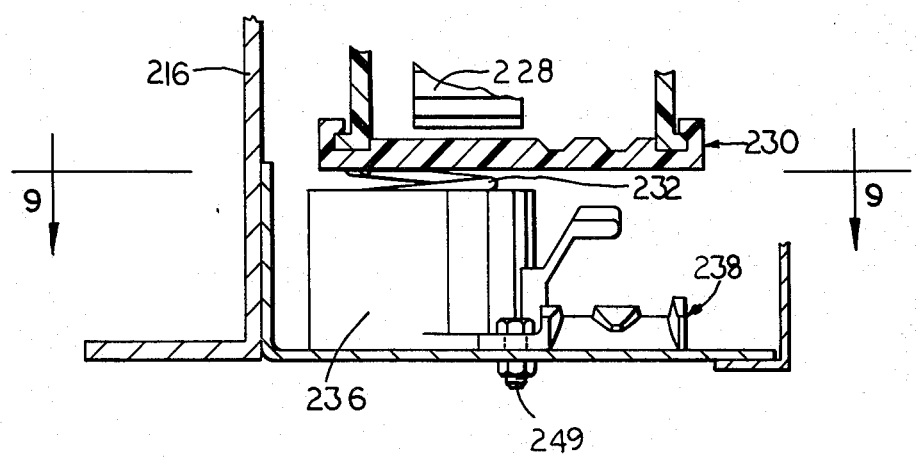
FIG. 8 is a fragmentary view in transverse section of conveyor having a drive for live rollers constructed in accordance with another embodiment of this invention.
Figure 9:
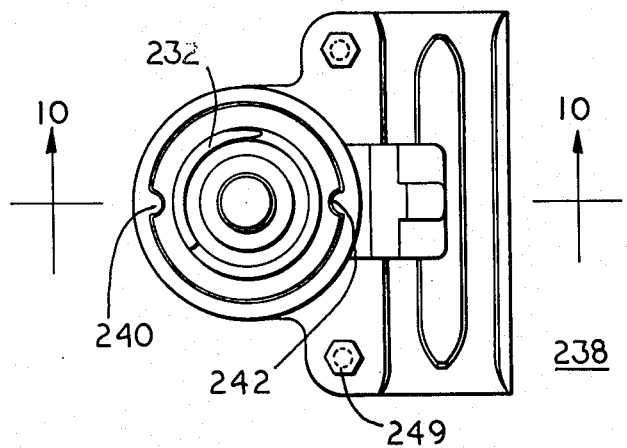
FIG. 9 is a plan view of an actuating assembly of the drive for live rollers illustrated in FIG. 8, looking in the direction of the arrows 9—9 in FIG. 8.
Figure 10:
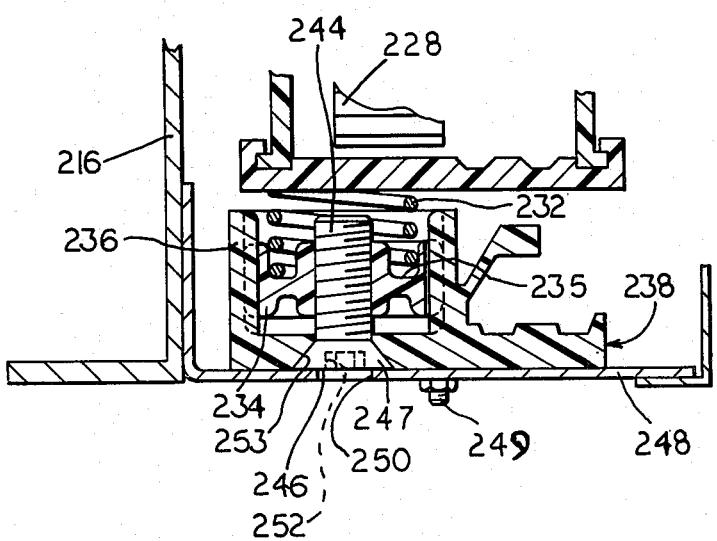
FIG. 10 is a view in section taken on the line 10—10 in FIG. 9.

In FIGS. 8, 9 and 10 is shown a fragmentary part of a conveyor having a side rail 216 on which a housing 230 (only a part of which is shown) is pivotally mounted. The housing 230 is urged upwardly into position for a friction roll 228 thereof to drive article supporting rollers (not shown) all of which can be similar in construction to like members of the structure already described.

The housing 230 is urged upwardly by a compression spring 232. The compression spring 232 is supported by a plunger 234. A circular groove 235 in the plunger 234 receives an end portion of the compression spring 232. The plunger 234 can move up and down inside a cylindrical head portion 236 of an actuator molding 238. Splines 240 on the inner wall of the cylindrical head portion 236 are received in guide grooves 242 in the plunger 234. A screw member 244 is threaded in the plunger 234. A portion of a lower face 246 of a head 247 of the screw member 244 engages an angle-shaped frame 248. The actuator molding 238 is attached to the frame 248 by fasteners 249. An access opening 250 in the frame 248 permits access to a socket 252 in the head 247. The head 247 is received in a socket 253 in the actuator molding 238. The screw member 244 can be turned to advance the plunger 234 up and down to vary the compressive force of the spring 232 to adjust the driving pressure of the friction roll 228 to a selected pressure.

The conveyors illustrated in the drawings and described above are subject to structural modification without departing from the spirit and scope of the appended claims.

Having described our invention, what we claim as new and desire to secure by Letters Patent is:

1. A conveyor which comprises a stationary frame, a plurality of article supporting rollers rotatably mounted on the frame for rotation about respective axes in fixed relation to the frame, a plurality of housings pivotally mounted on the frame below the rollers, a friction roll rotatably mounted in each housing, each friction roll being adapted to drive at least one of the article supporting rollers, the axis of each friction roll and the axis of swinging of each housing being parallel to the axis of the associated article supporting roller, a diaphragm engageable with each housing, means for supplying fluid under a selected pressure to each of the diaphragms to cause each diaphragm to raise the associated housing to bring the associated friction roll into driving relation to the associated article supporting roller to provide a friction drive thereof while resistance to turning of said supporting roll does not exceed a magnitude corresponding to the selected pressure, and means for driving the friction rolls to drive the article supporting rollers, the means for driving the friction rolls including a sprocket member mounted on each friction roll, a drive chain course in mesh with the sprocket member, and a bottom plate releasably mounted on each housing underlying the drive chain course to hold the drive chain course in mesh with the associated sprocket member when the bottom plate is in a first position, the bottom plate being movable to a second position to release the drive chain course to permit disengagement of the drive chain course from the associated housing and sprocket member.

* * * * *